United States Patent
Wang et al.

(10) Patent No.: US 10,146,874 B2
(45) Date of Patent: Dec. 4, 2018

(54) REFINING TOPIC REPRESENTATIONS

(71) Applicant: FUJITSU LIMITED, Kawasaki-shi, Kanagawa (JP)

(72) Inventors: Jun Wang, San Jose, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 493 days.

(21) Appl. No.: 14/925,914

(22) Filed: Oct. 28, 2015

(65) Prior Publication Data

US 2017/0124190 A1  May 4, 2017

(51) Int. Cl.
*G06F 17/30* (2006.01)

(52) U.S. Cl.
CPC .. *G06F 17/30864* (2013.01); *G06F 17/30011* (2013.01); *G06F 17/30705* (2013.01)

(58) Field of Classification Search
CPC ......... G06F 17/30864; G06F 17/30011; G06F 17/30705
USPC ....................................................... 707/709
See application file for complete search history.

(56) References Cited

U.S. PATENT DOCUMENTS

2014/0186817 A1* 7/2014 Wang ..................... G09B 7/00
                                                    434/362
2017/0004184 A1* 1/2017 Jain ..................... G06F 17/2735

OTHER PUBLICATIONS

Kireyev, K., "Semantic-based Estimation of Term Informativeness" Human Language Technologies: The 2009 Annual Conference of the North American Chapter of the ACL, pp. 530-538, Boulder, Colorado, Jun. 2009.
Vilnis, L. and Andrew McCallum, "Word Representations via Gaussian Embedding," School of Computer Science University of Massachusetts, Published as a conference paper at ICLR, May 1, 2015.
Gabrilovich E. and Shaul Markovitch, "Wikipedia-based Semantic Interpretation for Natural Language Processing," Journal of Artificial Intelligence Research 34 (2009) 443-498.
Wu Z. and C. Lee Giles, "Measuring Term Informativeness in Context," Proceedings of NAACL-HLT 2013, pp. 259-269, Atlanta, Georgia, Jun. 9, 2013.
Stewart M., "Natural Language Feature Selection via Cooccurrence," Term Cooccurrence, Mar. 11, 2014.
Wang Y., "Peacock: Learning Long-Tail Topic Features for Industrial Applications," ACM Transactions on Intelligent Systems and Technology, vol. 9, No. 4, Article 39, Publication date: Dec. 2014.

(Continued)

*Primary Examiner* — Joshua Bullock
(74) *Attorney, Agent, or Firm* — Maschoff Brennan

(57) ABSTRACT

A method to refine topic representations is described. The method may include identifying an original topic representation for a set of electronic documents stored at least temporarily in a non-transitory storage media. The method may include performing, by a processor, an informativeness analysis on the original topic representation. The method may also include performing a topic consistency analysis on the original topic representation. The method may include performing a topic redundancy analysis on the original topic representation in view of a second topic representation. The method may also include generating a refined topic representation based on the informativeness analysis, the consistency analysis and the redundancy analysis.

17 Claims, 6 Drawing Sheets

(56) References Cited

OTHER PUBLICATIONS

Newman D. et al., "Automatic Evaluation of Topic Coherence," Human Language Technologies: The 2010 Annual Conference of the North American Chapter of the ACL, pp. 100-108, Jun. 2010.
U.S. Appl. No. 14/796,978, filed Jul. 10, 2015.
U.S. Appl. No. 14/818,672, filed Aug. 5, 2015.

* cited by examiner

REFINING TOPIC REPRESENTATIONS

FIELD

The embodiments discussed herein are related to refining topic representations.

BACKGROUND

A topic model is a type of statistical model for discovering the "topics" be contained in a corpus of documents. The topic model may include an unsupervised text mining method which may automatically discover latent topics from a set of text documents and may provide an organized manner by which a user may explore the corpus of documents.

The subject matter claimed herein is not limited to embodiments that solve any disadvantages or that operate only in environments such as those described above. Rather, this background is only provided to illustrate one example technology area where some embodiments described herein may be practiced. Further, unless otherwise indicated, the materials described in the background section are not prior art to the claims in the present application and are not admitted to be prior art by inclusion in this section.

SUMMARY

According to an aspect of an embodiment, a method to refine topic representations may include identifying an original topic representation for a set of electronic documents stored at least temporarily in a non-transitory storage media. The method may include performing, by a processor, an informativeness analysis on the original topic representation. The method may also include performing a topic consistency analysis on the original topic representation. The method may include performing a topic redundancy analysis on the original topic representation in view of a second topic representation. The method may also include generating a refined topic representation based on the informativeness analysis, the consistency analysis and the redundancy analysis.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
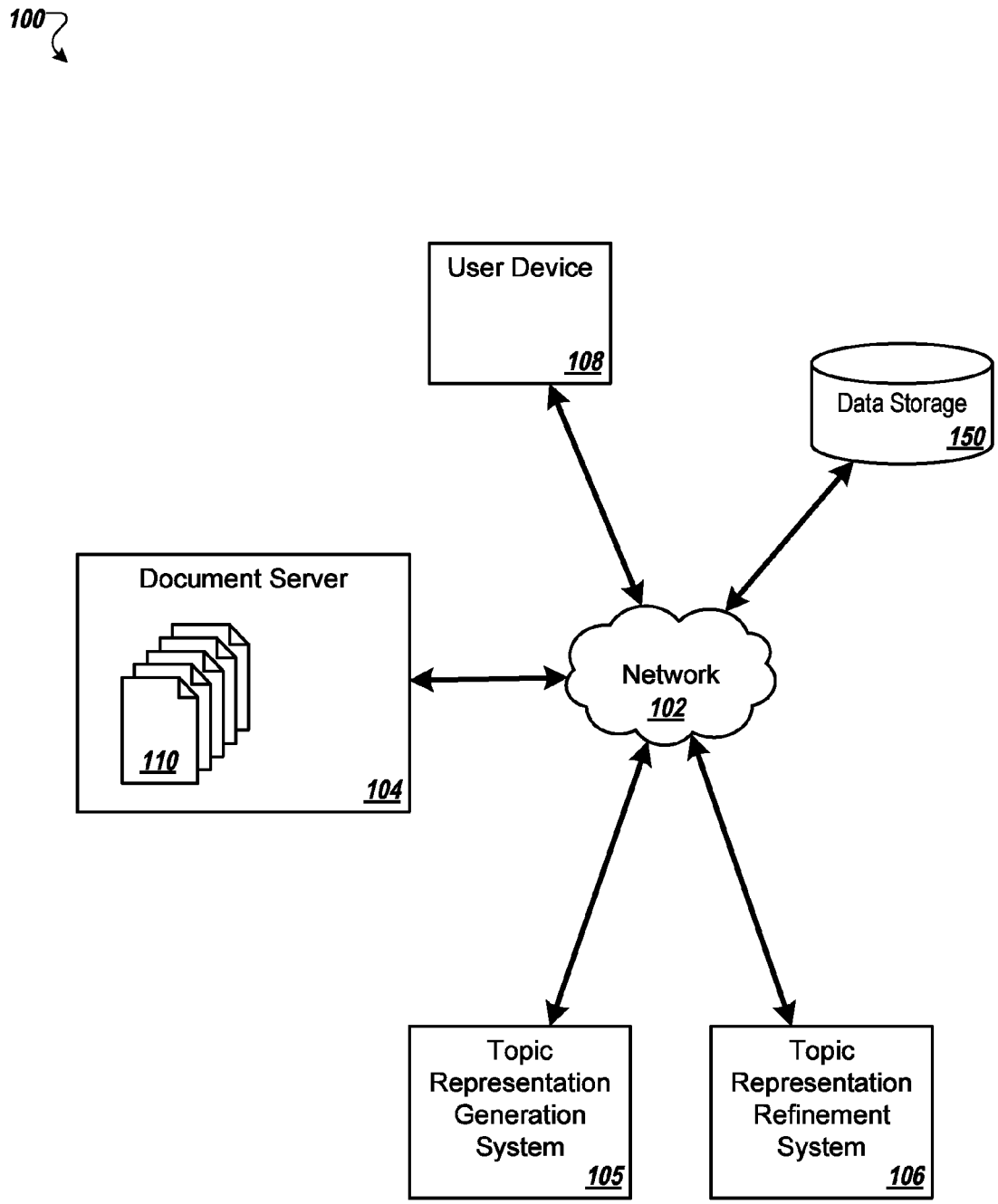
FIG. 1 is a block diagram of an example operating environment in which some embodiments may be implemented.

The World Wide Web (Web) may be described as an ocean of information and knowledge. Through the Web and other advances in computer technologies, people may have greater access to information than ever before. However, much of the available information may be scattered around the Web and may not be well described or structured, which may result in significant problems in their use, search, organization and management. Thus, it may not be easy for individuals to locate and sort through the vast amount of information that may be available. Some attempts to organize this vast amount of information include using a topic model to automatically discover topics within a corpus of documents. Such topic models, however, may output uninformative topics, inconsistent topics and/or redundant topics, which may not be helpful for users who may use the topics for various purposes, including online learning.

Some embodiments described in the present disclosure may be used to provide an approach to refine one or more topic representations for a set of electronic documents. In some embodiments, a method to generate a topic representation for a set of electronic documents may include identifying an original topic representation for a set of electronic documents stored at least temporarily in a non-transitory storage media. The method may include performing, by a processor, an informativeness analysis on the original topic representation. The method may also include performing a topic consistency analysis on the original topic representation. The method may include performing a topic redundancy analysis on the original topic representation in view of a second topic representation. The method may also include generating a refined topic representation to replace the original topic representation based on the informativeness analysis, the consistency analysis and the redundancy analysis. A user device may consume a significant amount of computer resources (e.g., bandwidth) sorting through the uninformative topics, inconsistent topics, and/or redundant topics in some topic models. Some embodiments described herein may produce better topic representations with fewer uninformative topics, inconsistent topics, and/or redundant topics such that a user using such topic representations may consume fewer computer resources, thereby improving performance of a computing system operated by the user to access the topics.

The term "electronic documents," as used herein, may include any published article or electronic publication, such as in a scientific journal, conference, newspaper, book, blog, lecture notes, transcripts, webpage, or magazine. The electronic document may be peer-reviewed and may be available via a network, for example, the Internet. Electronic documents may be available in scientific literature databases. Some or all of the electronic documents may be organized into a group, which may be referred to as a "set of electronic documents."

Throughout the present disclosure, the term "knowledge point" is used to refer to "concepts" described in electronic documents. A knowledge point may correspond to key terms or phrases in the electronic documents. For example, an electronic document may pertain to machine learning. The knowledge points may correspond to and/or include technology terms discussed in machine learning courses such as "neural networks", "statistical inference", "clustering", and "structural predictions."

FIG. 1 illustrates a block diagram of an example operating environment 100 in which some embodiments may be implemented, arranged in accordance with at least one embodiment described herein. The operating environment 100 may include a network 102, a document server 104, a topic representation generation system 105, a topic representation refinement system 106, a user device 108 and a data storage 150.

In general, the network 102 may include one or more wide area networks (WANs) and/or local area networks (LANs) that enable the topic representation generation system 105, topic representation refinement system 106, and/or the user device 108 to access electronic documents 110 on the document server 104 and/or to communicate with each other. In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

The example operating environment 100 may include any number of document servers 104 that each may host and/or store one or more electronic documents 110. The document server 104 may include one or more computing devices, (such as a rackmount server, a router computer, a server computer, a personal computer, a mainframe computer, a laptop computer, a web server, a proxy server, a desktop computer, etc.), data stores (e.g., hard disks, memories, databases), networks, software components, and/or hardware components.

The electronic documents 110 may include any of a variety of online resources such as webpages, weblogs ("blog"), books, e-books, articles, social media, open courseware (OCW) learning materials, massive open online courses (MOOC) learning materials, course pages for courses taught at educational institutions by individuals including professors and lecturers, lecture notes and/or recordings (e.g., video and/or audio recordings) associated with such courses, or the like or any combination thereof. The electronic documents 110 may include, for example, lecture notes, syllabi, videos, video transcripts, example problems/solutions, lecture slides, and other materials. A particular electronic document 110 may have one or more authors. The electronic documents 110 may be accessible on websites hosted by one or more corresponding web servers (e.g., document server 104) communicatively coupled to the Internet.

The user device 108 may include a computing device which may include, but is not limited to, a desktop computer, a laptop computer, a tablet computer, a mobile phone, a smartphone, a personal digital assistant (PDA), or other suitable computing device. A user may use the user device to find electronic documents 110 that satisfy or match a particular topic label. Although not separately illustrated, the user device 108 typically communicates with the topic label generation system 105 and the topic label refinement system 106 over network 102.

The topic representation generation system 105 and the topic representation refinement system 106 may include a hardware server (or servers) that includes a processor, a memory, and network communication capabilities. In the illustrated embodiment, the topic representation generation system 105 and the topic representation refinement system 106 may both be coupled to the network 102 to send and receive data to and from the user device 108 and/or the document server 104 via the network 102. In at least one embodiment, the topic representation generation system 105 and the topic representation refinement system 106 may reside on the same hardware server. In at least one embodiment, the topic representation generation system 105 and the topic representation refinement system 106 may be part of the same application or program. The topic representation generation system 105 and the topic representation refinement system 106 may include a set of instructions executable by a processor to provide the functionality described herein. In some instances, the topic representation generation system 105 and the topic representation refinement system 106 may be stored in or at least temporarily loaded into a memory and may be accessible and executable by the processor. The topic representation generation system 105 and the topic representation refinement system 106 may be adapted for cooperation and communication with the processor and other components via a bus (not illustrated in FIG. 1). Alternatively or additionally, one or more of the topic representation generation system 105 and the topic representation refinement system 106 may be implemented in hardware.

In at least one implementation, the data storage 150 may include a memory (e.g., random access memory), a cache, a drive (e.g., a hard drive), a flash drive, a database system, or another type of component or device capable of storing data. The data storage 150 may also include multiple storage components (e.g., multiple drives or multiple databases) that may span multiple computing devices (e.g., multiple server computers).

The topic representation generation system 105 may be configured to extract knowledge points from the electronic documents 110. Based on the extracted knowledge points, the topic representation generation system 105 may automatically discover topics contained in the electronic documents 110 based on a topic model analysis, and further generate at least one descriptive topic label for each discovered topic. It at least one embodiment, the topic representation generation system 105 may use or improve upon techniques for generating descriptive topic labels, as further described in U.S. patent application Ser. No. 14/880,087, entitled "GENERATING DESCRIPTIVE TOPIC LABELS, filed on Oct. 9, 2015, the entirety of which is incorporated by reference, or techniques described in U.S. patent application Ser. No. 14/796,978, entitled "PROCESSING SEARCH QUERIES FOR OPEN EDUCATION RESOURCES, filed on Jul. 10, 2015, the entirety of which is incorporated by reference.

Some of the topics produced or discovered by the topic model analysis, however, may be less informative, less consistent, or possibly redundant with respect to other topics. So topic representations may be refined to improve their ability to organize the documents.

In general, the topic representation refinement system 106 enables automated refinement of topic representations. The refined topic representations may provide informative, consistent and concise topics compared with the topics initially discovered by the topic representation generation system 105 during topic model analysis using the electronic documents 110.

The topic representation refinement system 106 may refine the topic representations without or with minimal action by an individual. For example, manual operations such as reading, evaluating, and relating the electronic documents 110 may be included in operations performed by the topic representation refinement system 106.

When refining topic representations, the topic representation refinement system 106 may perform a topic informativeness analysis for each topic based on knowledge points in the topic. As part of the topic informativeness analysis, the topic representation refinement system 106 may measure an informativeness feature of each knowledge point in the topic representation. The topic representation refinement system 106 may also generate an informativeness value for the topic based on the informativeness features of each knowledge point in the topic representation. If the informativeness value for the topic is above a threshold, the topic representation refinement system 106 may keep the topic for further analysis. If the informativeness value for the topic is below a threshold, the topic representation refinement system 106 may filter out or discard the topic.

For topics with respective informativeness values being above the minimum informativeness value threshold, the topic refinement system 106 may also perform a topic inconsistency analysis on those topics. As part of the topic inconsistency analysis, the topic representation refinement system 106 may generate a semantic vector representation of knowledge points within each topic. The topic representation refinement system 106 may calculate a centroid of the topic and calculate an average distance between the knowledge points in the topic and the centroid. In at least one embodiment, the processing logic may calculate an average semantic distance between the knowledge points and the centroid. If the distance to the centroid (or the average semantic distance between the knowledge points and the centroid) is below a maximum centroid distance threshold, the topic representation refinement system 106 may keep the topic for further analysis. If the distance to the centroid (or the average semantic distance between the knowledge points and the centroid) is above a minimum centroid distance threshold, the topic representation refinement system 106 may filter out or discard the topic. In at least one embodiment, the maximum centroid distance and the minimum centroid distance are the same value.

For topics with the average semantic distances between the knowledge points and the centroid being above the minimum centroid distance threshold, the topic representation refinement system 106 may perform a redundancy analysis between at least two topics. As part of the redundancy analysis, the topic representation refinement system 106 may generate a semantic vector representation of knowledge points within each topic representation, which may be the same or different semantic vector representation generated as part of the topic inconsistency analysis. The topic representation refinement system 106 may calculate a centroid of the topic, which may be the same or different centroid generated as part of the topic inconsistency analysis. The topic representation refinement system 106 may calculate a distance between the knowledge points in the at least two topics and the centroids of the at least two topics representation.

If the distance between the centroids of two topics is above a second minimum centroid distance threshold, the topic representation refinement system 106 may keep these two topics. If the distance between the centroids of two topics is below a second maximum centroid distance threshold, the topic representation refinement system 106 may merge the two topics. In at least one embodiment, the topic representation refinement system 106 may treat the merged topic any other topic and may perform refinement of the merged topic, using the techniques described. In at least one embodiment, the second maximum centroid distance and the second minimum centroid distance are the same value. After merge, the frequency information in the topic representation may be merged and updated.

Modifications, additions, or omissions may be made to the example operating environment 100 without departing from the scope of the present disclosure. Specifically, embodiments of the environment 100 are depicted in FIG. 1 as including one network 102, one user device 108, one topic representation generation system 105, one topic representation refinement system 106, and one data storage 150. However, the present disclosure applies to an environment 100 including one or more networks 102, one or more document servers 104, one or more user devices 108, one or more topic representation generation systems 105, one or more topic representation refinement systems 106, one or more data storages 150, or any combination thereof.

Moreover, the separation of various components in the embodiments described herein is not meant to indicate that the separation occurs in all embodiments. Additionally, it may be understood with the benefit of this disclosure that the described components may be integrated together in a single component or separated into multiple components.

FIGS. 2-5 are flow diagrams of various methods related to refinement of a topic representation for a set of electronic documents. The methods may be performed by processing logic that may include hardware (circuitry, dedicated logic, etc.), software (such as is run on a general purpose computer system or a dedicated machine), or a combination of both, which processing logic may be included in the topic representation refinement system 106 or another computer system or device. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. The methods illustrated and described in conjunction with FIGS. 2-5 may be performed, for example, by a system such as the topic representation refinement system 106 of FIG. 1. However, another system, or combination of systems, may be used to perform the methods. Although illustrated as discrete blocks, various blocks may be divided into additional blocks, combined into fewer blocks, or eliminated, depending on the desired implementation.

Figure 2:
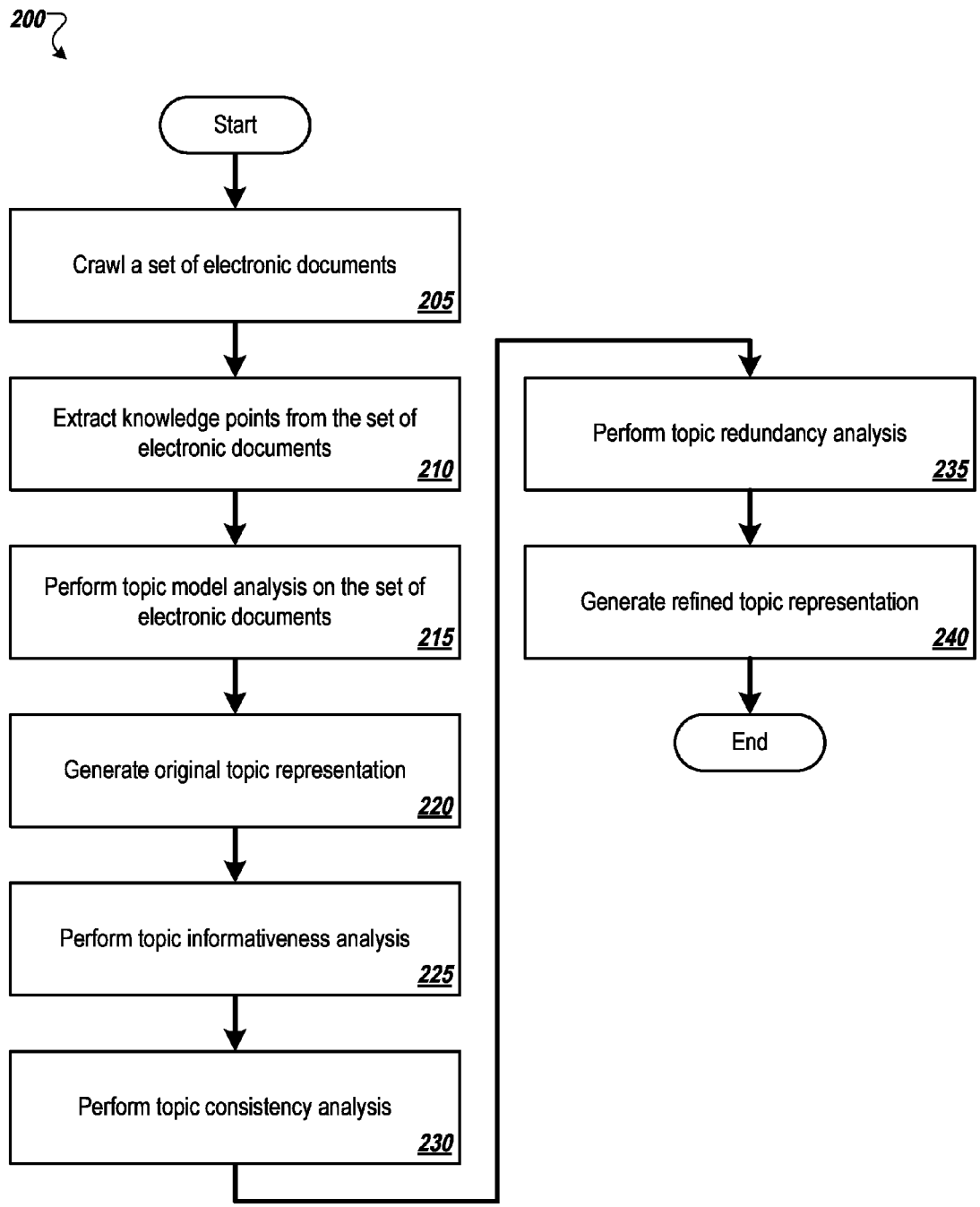
FIG. 2 illustrates an example flow diagram of a method of refinement of a topic representation for a set of electronic documents that may be implemented in the operating environment of FIG. 1.

FIG. 2 illustrates an example flow diagram of a method 200 of refinement of a topic representation for a set of electronic documents that may be implemented in the operating environment of FIG. 1, arranged in accordance with at least one embodiment described in the present disclosure.

The method 200 may begin at block 205, where processing logic may crawl a set of electronic documents stored at least temporarily in a non-transitory storage medium. In some embodiments, the processing logic automatically crawls the set of electronic documents. In some embodiments, the processing logic may crawl the set of electronic documents in response to receiving a request to generate a topic representation for topics discovered in the set of electronic documents. The processing logic may crawl a document server, such as the document server 104 of FIG. 1. Electronic documents may be stored on a single document server or may be distributed among multiple document servers. While crawling the document server, the processing logic may identify, scan, extract and copy content of the electronic documents. For example, the processing logic may perform operations performed by a web crawler, a web spider, an ant, an automatic indexer, a web scutter, or another suitable bot. The processing logic may copy pages or some data included therein that the processing logic visits and/or communicate information and data included in the electronic documents. The processing logic may store crawled information, including the electronic documents themselves, in a data storage, such as in data storage 150 of FIG. 1.

At block 210, the processing logic may extract knowledge points from the set of electronic documents. The processing logic may discover a predetermined number of topics from the set of electronic documents. When extracting the knowledge points from the set of electronic documents, the processing logic may receive segmented term sequences in the electronic documents. The processing logic may discover repeated phrase instances of the segmented term sequences. The phrase instances may be limited by a predetermined maximum length. The processing logic may generate the knowledge points from the segmented term sequences. The processing logic may identify the knowledge points for each electronic document in the set. The processing logic may identify a phrase (i.e., more than one word) as a knowledge point and may treat each identified knowledge point phrase as a single unit ("word"). The processing logic may perform statistical analysis to automatically extract fine-granularity knowledge points without solely relying on precise linguistic analysis or manual input and/or selection by a user. The processing logic may also use any of the techniques described in U.S. patent application Ser. No. 14/796,838, entitled "EXTRACTION OF KNOWLEDGE POINTS AND RELATIONS FROM LEARNING MATERIALS," filed on Jul. 10, 2015, the contents of which are incorporated by reference.

At block 215, the processing logic may perform topic model analysis on the set of electronic documents. The processing logic may organize each electronic document in the set of electronic documents by topic. The processing logic may treat the phrases extracted from knowledge point extraction at block 210 as basic units. The processing logic may extract topic representations from the set of electronic documents, where the representation of each topic may be determined in terms of a probability distribution over all vocabulary in the set of electronic documents, where vocabulary may refer to all single words and knowledge point phrases.

At block 220, the processing logic may generate at least one original topic representation, such as by using techniques or modifying techniques for generating topic representations described in U.S. patent application Ser. No. 14/880,087, entitled "GENERATING DESCRIPTIVE TOPIC LABELS, filed on Oct. 9, 2015, the entirety of which is incorporated by reference.

Figure 3:
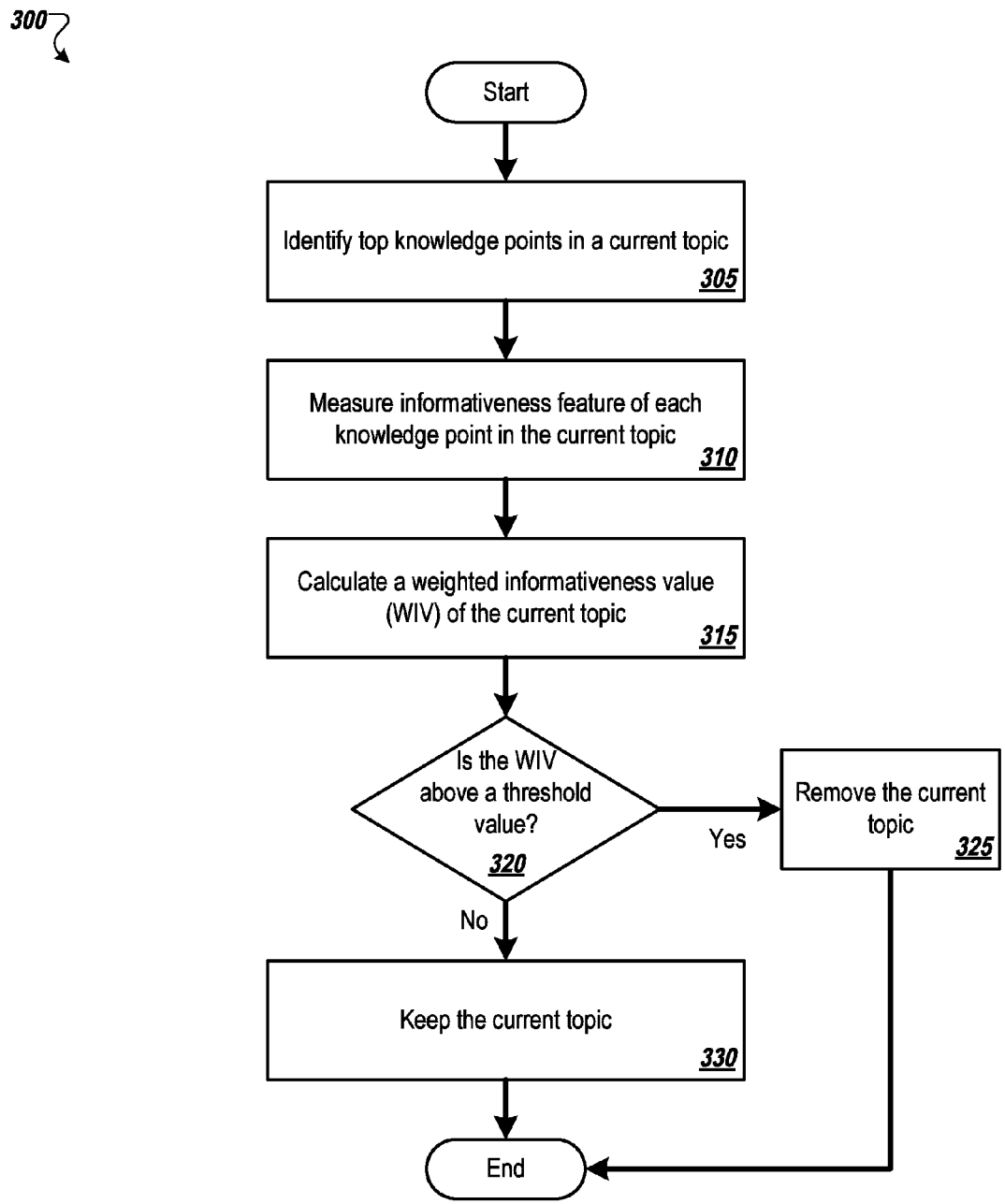
FIG. 3 illustrates an example flow diagram of a method to perform a topic informativeness analysis.

At block 225, the processing logic may perform a topic informativeness analysis, as further described in conjunction with FIG. 3. At block 230, the processing logic may perform a topic consistency analysis, as further described in conjunction with FIG. 4. At block 235, the processing logic may perform a topic redundancy analysis, as further described in conjunction with FIG. 5. At block 240, the processing logic may generate a refined topic representation based on the topic informativeness analysis, the topic consistency analysis, and the topic redundancy analysis. The refined topic representation may be a better representation of at least some of the contents of the set of electronic documents as compared to the original topic representation. The processing logic may provide the refined topic representation on a display, such as via a graphical user interface (GUI).

In at least one embodiment, the processing logic may execute operations (e.g., blocks 205, 210, 215, 220, 225, 230, 235, and/or 240) related to a system that combines a topic representation generation system and a topic representation refinement system (e.g., a combined system that may include the topic representation generation system 105 and the topic representation refinement system 106 of FIG. 1). In at least one embodiment, the processing logic may execute operations (e.g., blocks 225, 230, 235, and/or 240) related to a standalone topic representation refinement system (e.g., the topic representation refinement system 106 of FIG. 1) that receives the original topic representation from a topic representation generation system (e.g., topic representation generation system 105 of FIG. 1).

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

FIG. 3 illustrates an example flow diagram of a method 300 to perform a topic informativeness analysis. At block 305, the processing logic may identify top knowledge points in a current topic. In at least one embodiment, the knowledge points may have been determined at block 210 of FIG. 2. Each of the knowledge points in a current topic may have an associated quantifiable characteristic. In at least one embodiment, the processing logic may identify all knowledge points with a quantifiable characteristic above a characteristic threshold value. In at least one embodiment, the processing logic may identify a top portion or percentage of the knowledge points based on frequency distribution of the knowledge points and/or the quantifiable characteristic of the knowledge points.

At block 310, the processing logic may measure or calculate an informativeness feature of each knowledge point in the current topic, as identified at block 305. An informativeness feature may indicate how well a knowledge point may carry more semantic content than others, and is more specific, predictive and informative. In at least one embodiment, the processing logic may use machine learning techniques to select the best parameter for a combination of features. For example, the processing logic may use logistic regression based on positive (informative) and negative (uninformative) knowledge point examples. In at least one embodiment, latent semantic analysis (LSA) may be used to measure the informativeness feature. Latent semantic analysis (LSA) is typically referred to as a technique in natural language processing to analyze relationships between a set of electronic documents and phrases therein by producing a set of concepts related to the set of electronic documents and phrases. Other techniques that may be used to measure the informativeness feature may include inverse document frequency (IDF), residualIDF (RIDF), variance (w), burstiness (w), gain (w), among others.

At block 315, the processing logic may calculate a weighted informativeness value of the current topic. The processing logic may assign a different weight to each knowledge point in the current topic (as identified at block 305) based on occurrence positions or frequency. For example, a knowledge point that occurs more frequently than other knowledge points may be assigned a higher weight than the other knowledge points. The processing logic may aggregate the weights that are assigned to the knowledge points to calculate the average weighted informativeness value of the current topic representation.

At block 320, the processing logic may determine whether the weighted informativeness value is above a minimum weighted informativeness threshold value. When the weighted informativeness value is above a weighted informativeness threshold value ("YES" at block 320), at block 325 the processing logic may remove, discard or filter out the current topic. When the weighted informativeness value is below the weighted informativeness threshold value ("NO" at block 320), at block 330 the processing logic may keep the current topic.

Figure 4:
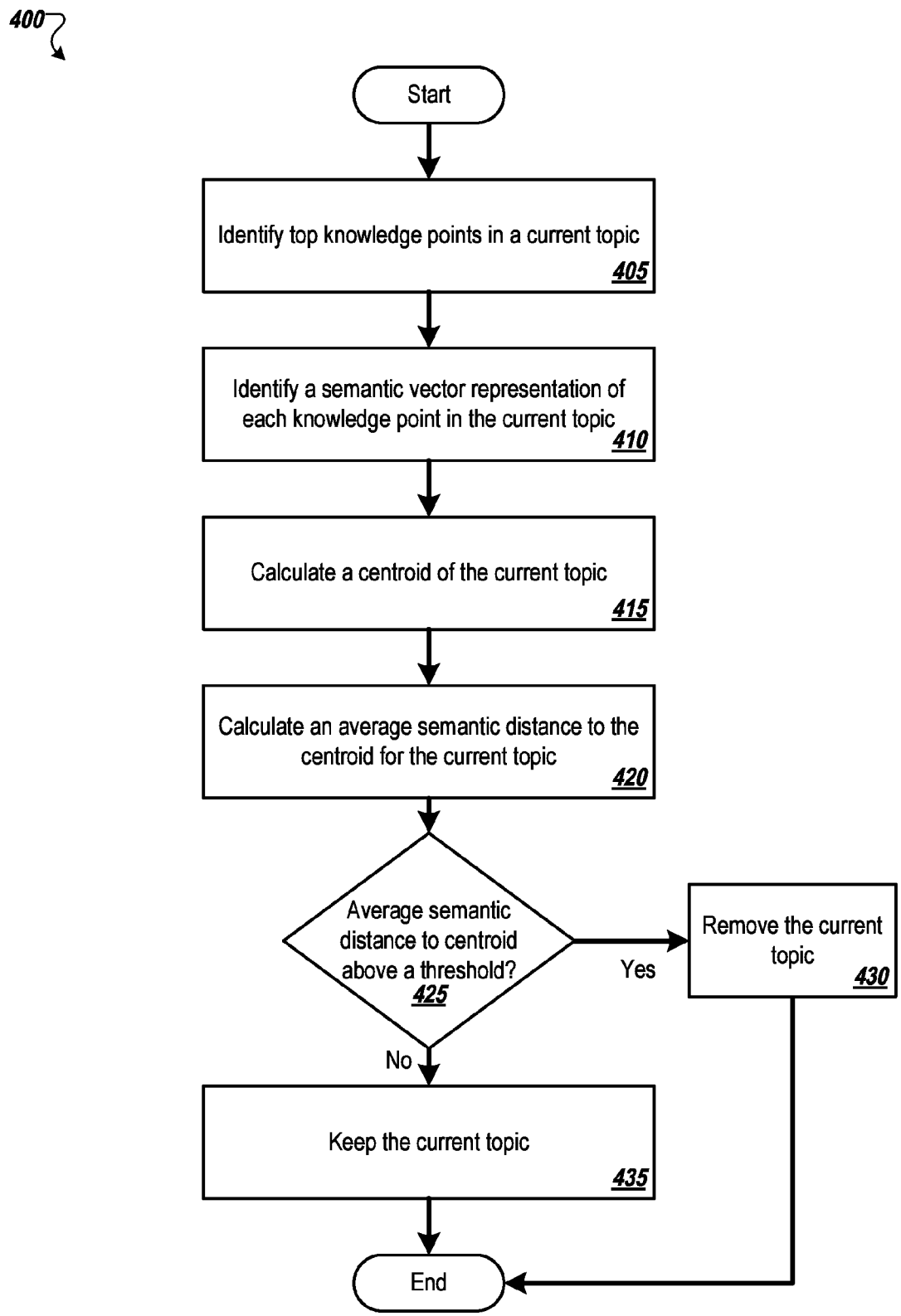
FIG. 4 illustrates an example flow diagram of a method to perform a topic consistency analysis.

FIG. 4 illustrates an example flow diagram of a method 400 to perform a topic consistency analysis. At block 405, processing logic may identify top knowledge points in a current topic, as further described in conjunction with block 305 of FIG. 3.

At block 410, the processing logic may identify a semantic vector representation of each knowledge point of the current topic. The semantic vector representation may be domain-specific. For example, the semantic vector representation may be a Wikipedia™-based explicit semantic analysis or word embedding. The semantic vector representation may be based on knowledge points or phrases instead of single words.

At block 415, the processing logic may calculate a centroid of the current topic. To calculate a centroid of the current topic, the processing logic may calculate an average semantic vector based on some or all of the knowledge points (or the top selected knowledge points) in the current topic.

At block 420, the processing logic may calculate an average semantic distance to the centroid for the current topic. In at least one embodiment, the processing logic may calculate an average distance of all knowledge points (or the top selected knowledge points) in the current topic to the centroid. A larger average semantic distance may indicate that the knowledge points (and topic) is more inconsistent.

At block 425, the processing logic may determine whether the average semantic distance to the centroid for the current topic is above a minimum second centroid distance threshold value. The minimum second centroid distance threshold value may be a static value or a dynamic value that may be updated (e.g., by a system administrator, machine learning). When the average semantic distance to the centroid for the current topic is above a maximum second centroid distance threshold value ("YES" at block 425), at block 430 the processing logic may remove, discard or filter out the current topic. When the average semantic distance to the centroid for the current topic is below the minimum second centroid distance threshold value ("NO" at block 425), at block 435 the processing logic may keep the current topic.

Figure 5:
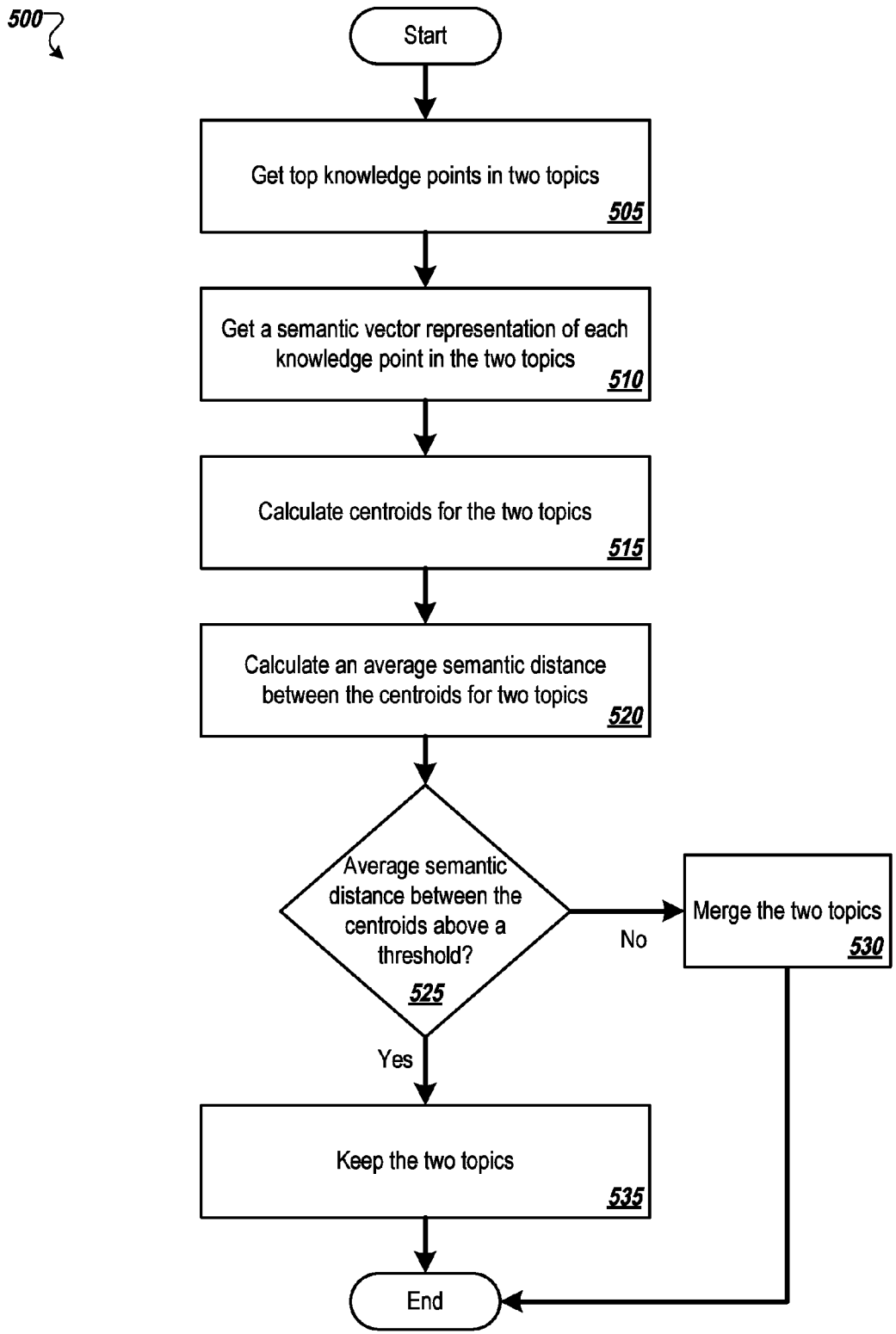
FIG. 5 illustrates an example flow diagram of a method to perform a topic redundancy analysis.

FIG. 5 illustrates an example flow diagram of a method 500 to perform a topic redundancy analysis. At block 505, the processing logic may identify top knowledge points in at least two topics, in a manner similar to the description in conjunction with block 305 of FIG. 3.

At block 510, the processing logic may identify a semantic vector representation of each knowledge point of the at least two topics, in a manner similar to the description in conjunction with block 410 of FIG. 4.

At block 515, the processing logic may calculate a centroid of the at least two topics, in a manner similar to the description in conjunction with block 415 of FIG. 4.

At block 520, the processing logic may calculate an average semantic distance between centroids for the at least two topics. In at least one embodiment, the processing logic may repeat block 520 for each possible pair of topics. In at least one embodiment, the processing logic may calculate an average semantic distance between two centroids with respect to two topics at a time. A larger distance between centroids of two topics may indicate less similarity (e.g., less overlap or redundancy).

At block 525, the processing logic may determine whether the average semantic distance between the centroids for the at least two topics is above a third minimum centroid distance threshold value. The third minimum centroid distance threshold value may be a static value or a dynamic value that may be updated (e.g., by a system administrator, machine learning). When the average semantic distance between the centroids for the at least two topics is below a third centroid distance threshold value ("NO" at block 525), at block 530 the processing logic may merge the at least two topics. When the average semantic distance between the centroids for the at least two topics is above the third centroid distance threshold value ("YES" at block 525), at block 535 the processing logic may keep the at least two topics. In at least one embodiment, merging the original topic and the second topic include (a) assigning the original topic or the second topic to the resulting merged topic, or (b) generating a third topic.

Figure 6:
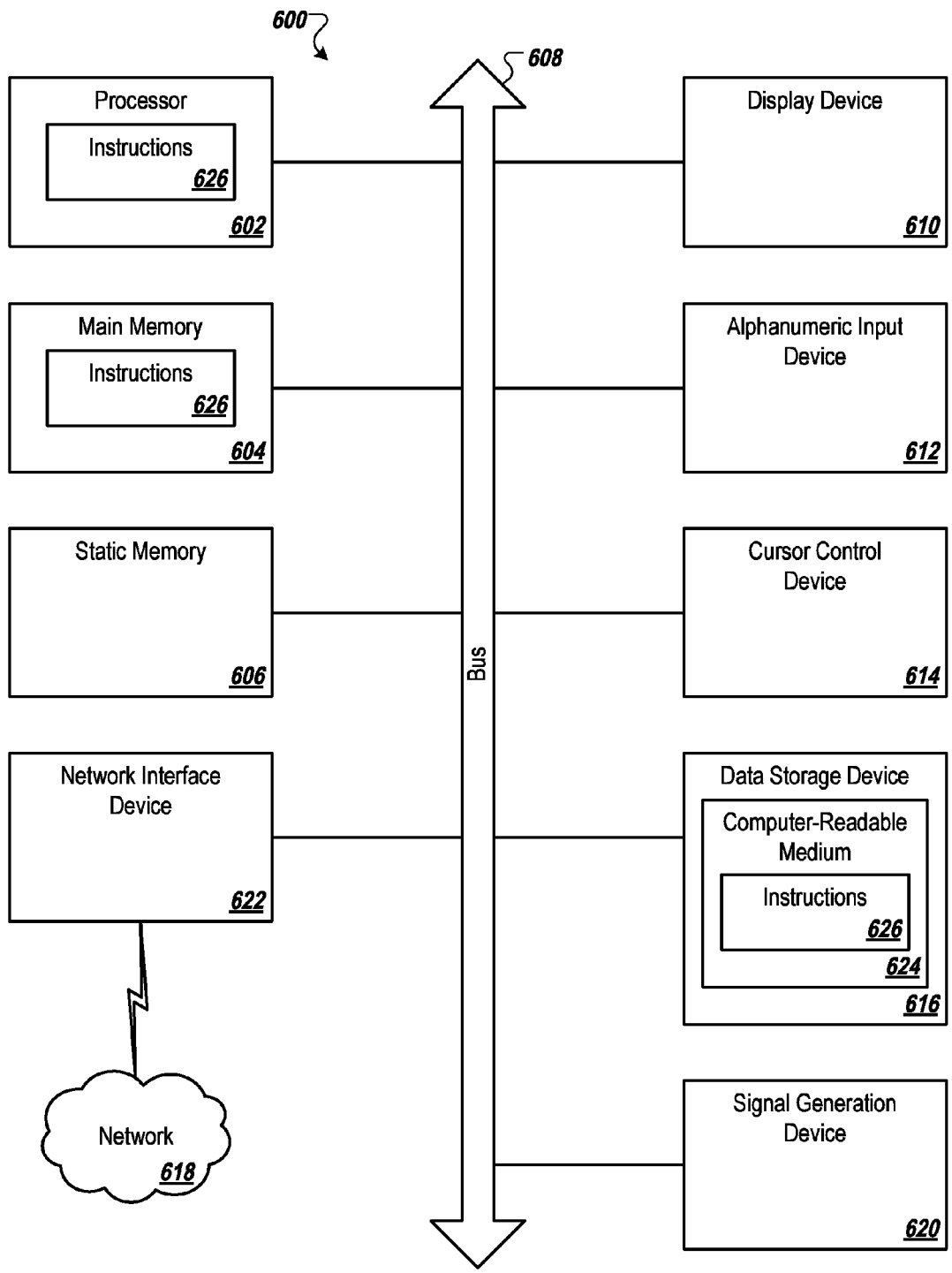
FIG. 6 illustrates a diagrammatic representation of a machine in an example form of a computing device within which a set of instructions, for causing the machine to perform any one or more of the methods discussed herein, may be executed.

FIG. 6 illustrates a diagrammatic representation of a machine in the example form of a computing device 600 within which a set of instructions, for causing the machine to perform any one or more of the methods discussed herein, may be executed. The computing device 600 may include a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 616, which communicate with each other via a bus 608.

Processing device 602 represents one or more general-purpose processing devices such as a microprocessor, central processing unit, or the like. More particularly, the processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also include one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computing device 600 may further include a network interface device 622 which may communicate with a network 618. The computing device 600 also may include a display device 610 (e.g., a liquid crystal display (LCD) or a cathode ray tube (CRT)), an alphanumeric input device 612 (e.g., a keyboard), a cursor control device 614 (e.g., a mouse) and a signal generation device 620 (e.g., a speaker). In one implementation, the display device 610, the alphanumeric input device 612, and the cursor control device 614 may be combined into a single component or device (e.g., an LCD touch screen).

The data storage device 616 may include a computer-readable storage medium 624 on which is stored one or more sets of instructions 626 (e.g., system 106) embodying any one or more of the methods or functions described herein. The instructions 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 618 via the network interface device 622.

While the computer-readable storage medium 626 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A method comprising:
    identifying, by a processor, an original topic representation for a set of electronic documents stored at least temporarily in a non-transitory storage media;
    performing, by the processor, an informativeness analysis on the original topic representation, wherein performing the informativeness analysis on the original topic representation comprises:
        identifying a set of knowledge points in the original topic representation;
        calculating an informativeness feature of each knowledge point in the set of knowledge points;
        calculating a weighted informativeness value of the original topic representation based on the informativeness feature of each knowledge point in the set of knowledge points;
        in response to determining that the weighted informativeness value is below a first threshold, removing the original topic representation; and
        in response to determining that the weighted informativeness value is above the first threshold, keeping the original topic representation;
    performing, by the processor, a topic consistency analysis on the original topic representation;
    performing, by the processor, a topic redundancy analysis on the original topic representation in view of a second topic representation; and
    generating, by the processor, a refined topic representation based on the informativeness analysis, the consistency analysis, and the redundancy analysis.

2. The method of claim 1, wherein identifying the original topic representation for the set of electronic documents comprises:
    crawling the set of electronic documents;
    extracting a plurality of knowledge points from the set of electronic documents;
    performing a topic model analysis on the knowledge points from the set of electronic documents; and
    selecting the original topic representation for the set of electronic documents based on the topic model analysis.

3. The method of claim 2, wherein each extracted knowledge point includes a word or a phrase that exists at least once in the set of electronic documents.

4. The method of claim 1, wherein performing the topic consistency analysis on the original topic representation comprises:
    identifying a set of knowledge points in the original topic representation;
    identifying a semantic vector representation of each knowledge point of the set of knowledge points;
    calculating a centroid of the original topic representation;
    calculating an average semantic distance to the centroid for the original topic representation;
    in response to determining that the average semantic distance to the centroid for the original topic representation is above a second threshold, removing the original topic representation; and
    in response to determining that the average semantic distance to the centroid for the original topic representation is below the second threshold, keeping the original topic representation.

5. The method of claim 1, wherein performing a topic redundancy analysis on the original topic representation in view of a second topic representation comprises:
    identifying a first set of knowledge points in the original topic representation and a second set of knowledge points in the second topic representation;
    identifying a semantic vector representation of each knowledge point of the first set of knowledge points and second set of knowledge points;
    calculating a first centroid of the original topic representation and a second centroid of the second topic representation;
    calculating an average semantic distance between the first centroid and the second centroid;
    in response to determining that the average semantic distance between the first centroid and the second centroid is below a third threshold, merging the original topic representation and the second topic representation; and
    in response to determining that the average semantic distance between the first centroid and the second centroid is above the third threshold, keeping the original topic representation and the second topic representation.

6. The method of claim 5, wherein merging the original topic representation and the second topic representation comprises: (a) assigning the original topic representation or the second topic representation to the resulting merged topic representation, or (b) generating a third topic representation.

7. A non-transitory computer-readable medium having encoded therein programming code executable by a processor to perform or control performance of operations comprising:
    identifying, by the processor, an original topic representation for a set of electronic documents stored at least temporarily in a non-transitory storage media;
    performing, by the processor, an informativeness analysis on the original topic representation;
    performing, by the processor, a topic consistency analysis on the original topic representation, wherein performing the topic consistency analysis on the original topic representation comprises:

identifying a set of knowledge points in the original topic representation;

identifying a semantic vector representation of each knowledge point of the set of knowledge points;

calculating a centroid of the original topic representation;

calculating an average semantic distance to the centroid for the original topic representation;

in response to determining that the average semantic distance to the centroid for the original topic representation is above a second threshold, removing the original topic representation; and in response to determining that the average semantic distance to the centroid for the original topic representation is below the second threshold, keeping the original topic representation;

performing, by the processor, a topic redundancy analysis on the original topic representation in view of a second topic representation; and generating, by the processor, a refined topic representation based on the informativeness analysis, the consistency analysis, and the redundancy analysis.

8. The non-transitory computer-readable medium of claim 7, wherein identifying the original topic representation for the set of electronic documents comprises:

crawling the set of electronic documents;

extracting a plurality of knowledge points from the set of electronic documents;

performing a topic model analysis on the knowledge points from the set of electronic documents; and selecting the original topic representation for the set of electronic documents based on the topic model analysis.

9. The non-transitory computer-readable medium of claim 8, wherein each extracted knowledge point includes a word or a phrase that exists at least once in the set of electronic documents.

10. The non-transitory computer-readable medium of claim 7, wherein performing the informativeness analysis on the original topic representation comprises:

identifying a set of knowledge points in the original topic representation;

calculating an informativeness feature of each knowledge point in the set of knowledge points;

calculating a weighted informativeness value of the original topic representation based on the informativeness feature of each knowledge point in the set of knowledge points;

in response to determining that the weighted informativeness value is below a first threshold, removing the original topic representation; and in response to determining that the weighted informativeness value is above the first threshold, keeping the original topic representation.

11. The non-transitory computer-readable medium of claim 7, wherein performing a topic redundancy analysis on the original topic representation in view of a second topic representation comprises:

identifying a first set of knowledge points in the original topic representation and a second set of knowledge points in the second topic representation;

identifying a semantic vector representation of each knowledge point of the first set of knowledge points and second set of knowledge points;

calculating a first centroid of the original topic representation and a second centroid of the second topic representation;

calculating an average semantic distance between the first centroid and the second centroid;

in response to determining that the average semantic distance between the first centroid and the second centroid is below a third threshold, merging the original topic representation and the second topic representation; and in response to determining that the average semantic distance between the first centroid and the second centroid is above the third threshold, keeping the original topic representation and the second topic representation.

12. The non-transitory computer-readable medium of claim 11, wherein merging the original topic representation and the second topic representation comprises (a) assigning the original topic representation or the second topic representation to the resulting merged topic representation or (b) generating a third topic representation.

13. A system comprising:

a memory; and a processing device operatively coupled to the memory, the processing device being configured to execute operations comprising:

identify an original topic representation for a set of electronic documents stored at least temporarily in a non-transitory storage media;

perform, by a processor, an informativeness analysis on the original topic representation;

perform a topic consistency analysis on the original topic representation;

perform a topic redundancy analysis on the original topic representation in view of a second topic representation, wherein when performing a topic redundancy analysis on the original topic representation in view of a second topic representation, the processing device is configured to:

identify a first set of knowledge points in the original topic representation and a second set of knowledge points in the second topic representation;

identify a semantic vector representation of each knowledge point of the first set of knowledge points and second set of knowledge points;

calculate a first centroid of the original topic representation and a second centroid of the second topic representation;

calculate an average semantic distance between the first centroid and the second centroid;

in response to determining that the average semantic distance between the first centroid and the second centroid is below a third threshold, merge the original topic representation and the second topic representation; and in response to determining that the average semantic distance between the first centroid and the second centroid is above the third threshold, keep the original topic representation and the second topic representation; and generate a refined topic representation based on the informativeness analysis, the consistency analysis, and the redundancy analysis.

14. The system of claim 13, wherein when identifying the original topic representation for the set of electronic documents, the processing device is configured to:

crawl the set of electronic documents;

extract a plurality of knowledge points from the set of electronic documents;

perform a topic model analysis on the knowledge points from the set of electronic documents; and select the original topic representation for the set of electronic documents based on the topic model analysis.

15. The system of claim 13, wherein when performing the informativeness analysis on the original topic representation, the processing device is configured to:

identify a set of knowledge points in the original topic representation;

calculate an informativeness feature of each knowledge point in the set of knowledge points;

calculate a weighted informativeness value of the original topic representation based on the informativeness feature of each knowledge point in the set of knowledge points;

in response to a determination that the weighted informativeness value is below a first threshold, remove the original topic representation; and in response to a determination that the weighted informativeness value is above the first threshold, keep the original topic representation.

16. The system of claim 13, wherein when performing the topic consistency analysis on the original topic representation, the processing device is configured to:

identify a set of knowledge points in the original topic representation;

identify a semantic vector representation of each knowledge point of the set of knowledge points;

calculate a centroid of the original topic representation;

calculate an average semantic distance to the centroid for the original topic representation;

in response to determining that the average semantic distance to the centroid for the original topic representation is above a second threshold, remove the original topic representation; and in response to determining that the average semantic distance to the centroid for the original topic representation is below the second threshold, keep the original topic representation.

17. The system of claim 13, wherein when merging the original topic representation and the second topic representation, the processing device is configured to (a) assign the original topic representation or the second topic representation to the resulting merged topic representation, or (b) generate a third topic representation.

* * * * *